(12) United States Patent
Tilp et al.

(10) Patent No.: US 6,379,560 B1
(45) Date of Patent: Apr. 30, 2002

(54) WATER PURIFYING APPARATUS AND METHOD FOR PURIFYING WATER

(75) Inventors: Joseph F. Tilp; Steven C. Peake, both of Dubuque; Chester E. Chomka, Bellevue; Thomas J. Larkner, Dubuque; Eric J. Willman, Dubuque; Kerry W. Leppert, Dubuque; Tina M. Timmerman, Dubuque, all of IA (US)

(73) Assignee: Barnstead/Thermodyne Corporation, Dubuque, IA (US)

( * ) Notice: Subject to any disclaimer, the term of this patent is extended or adjusted under 35 U.S.C. 154(b) by 0 days.

(21) Appl. No.: 09/520,529

(22) Filed: Mar. 8, 2000

(51) Int. Cl.$^7$ .................................................. C02F 1/30
(52) U.S. Cl. .................... 210/748; 210/195.1; 210/232; 210/258; 210/288
(58) Field of Search .............................. 210/748, 195.1, 210/232, 252, 258, 288

(56) References Cited

U.S. PATENT DOCUMENTS

| | | | |
|---|---|---|---|
| 4,151,085 A | 4/1979 | Malik .......................... 210/101 |
| 4,735,716 A | 4/1988 | Petrucci et al. ............. 210/232 |
| 4,769,131 A | 9/1988 | Noll et al. ..................... 210/85 |
| 5,128,035 A | 7/1992 | Clack et al. ................. 210/251 |
| 5,143,601 A | * 9/1992 | Slovak et al. |
| 5,194,149 A | * 3/1993 | Selbie et al. |
| 5,397,468 A | 3/1995 | Chomka et al. ............. 210/232 |
| 5,399,263 A | 3/1995 | Chomka et al. ......... 210/257.1 |
| 5,798,040 A | 8/1998 | Liang .......................... 210/232 |
| 5,833,850 A | 11/1998 | Liu ............................. 210/232 |
| 5,895,570 A | 4/1999 | Liang .......................... 210/232 |
| 5,919,357 A | 7/1999 | Wilkins et al. ............. 210/120 |
| 5,925,240 A | 7/1999 | Wilkins et al. ............... 210/88 |
| 5,935,426 A | 8/1999 | Giordano et al. ............. 210/87 |
| 5,935,441 A | 8/1999 | O'Neill et al. ............. 210/638 |
| 6,001,249 A | * 12/1999 | Baily et al. |
| 6,080,313 A | 6/2000 | Kelada ........................ 210/631 |
| 6,099,735 A | 8/2000 | Kelada ........................ 210/652 |

FOREIGN PATENT DOCUMENTS

| | | |
|---|---|---|
| DE | 4036191 | 2/1992 |
| DE | 29508591 | 6/1996 |

\* cited by examiner

*Primary Examiner*—Betsey Morrison Hoey
(74) *Attorney, Agent, or Firm*—Wood, Herron & Evans, LLP (57) ABSTRACT

A filter assembly for a water purifying apparatus including a plurality of cartridges. Each cartridge includes first and second ends and an interior volume containing a filtering medium. A plurality of end caps are respectively connected with the first ends of the plurality of cartridges and each end cap includes a water inlet and a water outlet. A removable manifold is coupled with the water inlets and water outlets and the manifold includes a pair of auxiliary ports. One auxiliary port directs water from the cartridge assembly to an auxiliary processing device and another auxiliary port directs the water from the auxiliary processing device back to the filter assembly. The water inlets and water outlets extend generally parallel to a longitudinal axis of each cartridge. The cartridge includes an outer tubular member in fluid communication with the water inlet and an inner tubular member in fluid communication with the water outlet. The inner tubular member has a first end connected in a sliding manner to the first end cap and a second end rigidly affixed to the second end cap.

22 Claims, 7 Drawing Sheets

WATER PURIFYING APPARATUS AND METHOD FOR PURIFYING WATER

FIELD OF THE INVENTION

The present invention generally relates to water purification systems and methods and, more specifically, to a filter assembly and methods using a plurality of cartridges coupled with a water distributing manifold for directing water in a serial or parallel manner through each cartridge.

BACKGROUND OF THE INVENTION

Water purification systems are used to provide high quality reagent grade water for various applications, including scientific testing and analysis applications. Many of these applications require that the total organic carbon content of the water be on the order of 10 parts per billion or less. They may further require a resistivity of up to 18.2 megohm-cm. ASTM Type I water is the highest purity and is used for high performance liquid chromography, atomic absorption spectrometry, tissue culture, etc. Type II water is less pure and may be used for hematological, serological, and microbiological procedures. Type III water is suitable for general laboratory qualitative analyses, such as urinalysis, parasitology and histological procedures. Two prior systems for purifying water are disclosed in U.S. Pat. Nos. 5,397,468 and 5,399,263, each assigned to the assignee of the present invention. The disclosure of each of these patents is hereby incorporated herein by reference.

Typical water purifiers have a cartridge assembly comprised of a plurality of purification cartridges. Each cartridge contains a purification media, such as a mass of resin beads, for purifying the water in accordance with the application requirements. The water flows through each cartridge in a serial manner. The water exits the final cartridge of the cartridge assembly in a purified condition and is dispensed as needed by the user.

Various manners of connecting the cartridges have been used in the past, including the use of separate fittings and fluid lines between the cartridges and the use of integral manifolds. Assemblies utilizing integral manifolds are not easily modifiable to accommodate a different cartridge configuration or and number of cartridges. If a different cartridge configuration or number of cartridges is desired or necessary, the entire assembly, including the manifold and cartridges is typically modified and retooled for manufacturing purposes. On the other hand, the use of separate fittings and fluid lines between the cartridges makes replacement difficult.

Another disadvantage of prior water purification systems, especially those utilizing integral manifolds, is that the water flow path may not be easily diverted from the cartridge assembly to an auxiliary processing device and back to the cartridge assembly. For example, an ultraviolet (UV) chamber may be used as an auxiliary processing device to reduce organics in the water. Ideally, the water is then returned to the cartridge assembly for a final polishing, or purification, through a final cartridge. Some systems have been configured such that the water does not pass through a final cartridge after going through the UV chamber. This can cause resistivity problems with the water dispensed from the system since any ionic impurities, such as oxidized organics, are not filtered out before dispensing the water. Another option used in prior systems has been to pass the water through the cartridge assembly entirely, and then pass the water through a UV chamber. A separate cartridge, which is not part of the cartridge assembly of the water purification system, is then used to polish the water before it is dispensed by the user. This makes cartridge replacement more difficult, however, since the user must replace both the cartridge assembly and a separate final filter or cartridge.

In view of the above problems noted in the art, as well as other problems and concerns, it would be desirable to provide a water purification system and methods utilizing a cartridge assembly which may be more easily reconfigured and which allows an auxiliary processing device, such as a UV chamber or another device, to be fluidly coupled with the cartridge assembly while also allowing a final polishing of the water flowing through the system.

SUMMARY OF THE INVENTION

The present invention therefore generally provides a water purifying apparatus and, more specifically, a filter assembly having various features for facilitating easier and more efficient manufacturing, set up and use of the apparatus. In one general aspect, the filter assembly comprises a plurality of cartridges affixed to one another with each cartridge having first and second ends. Each cartridge further includes a sidewall extending between the first and second ends and an interior volume. A filtering medium is contained within the interior volume for at least assisting in filtering water flowing through the interior volume. A plurality of end caps respectively connect with the first ends of the plurality of cartridges and each end cap includes a water inlet and a water outlet. A manifold couples to the water inlets and water outlets of the plurality of end caps to connect the cartridges for fluid communication such that the water flows through the filtering medium within the interior volume of one cartridge, through the manifold, preferably to the filtering medium within the interior volume of another cartridge. Cartridges may also or alternatively be fluidly coupled in a parallel manner. The manifold further includes a water inlet for directing water into the cartridges, a water outlet for directing water out of the cartridges and a pair of auxiliary ports. The auxiliary ports include an auxiliary output port for directing water from the cartridge assembly to an auxiliary processing device and an auxiliary input port for directing the water from the auxiliary processing device to one of the water inlets associated with an end cap. This aspect of the invention allows the auxiliary ports to be optionally used, for example, to direct water from the cartridge assembly to a UV chamber or other water processing device, and then back into the cartridge assembly for at least a final polishing operation to remove further organics or other contaminants. If such an auxiliary processing device is not necessary for any given application, the auxiliary output port may be fluidly coupled with the auxiliary input port to maintain the fluid coupling between the cartridges.

As another aspect of the invention, the manifold is removably coupled with the water inlets and water outlets of the plurality of end caps. Since the manifold is removable, a different configuration of the same cartridges and/or a different number of cartridges may be coupled in fluid communication, depending on the needs of any particular application, simply by providing a correspondingly configured manifold. Unlike past purifying systems having integral manifolds, only the removable manifold of the present invention is replaced to allow the reconfiguration. As another related aspect, which also allows for easier reconfiguration of the cartridges, the water inlet and water outlet associated with each end cap extends generally parallel to the longitudinal axis of the cartridge. Unlike prior cartridges, which have inlets and outlets extending generally transverse or perpendicular to the longitudinal axis of the cartridge, or have an inlet and outlet respectively located at opposite ends of the cartridge, this allows the manifold to be placed and fluidly coupled directly on top of the plurality of cartridges. This aspect further facilitates easy fluid connection and reconfiguration of the cartridges.

As another aspect of the invention, the cartridge preferably includes an outer tubular member having first and second ends and an interior volume. A first end cap is secured to the first end of the outer tubular member and includes a water inlet leading to the interior volume and a water outlet. A second end cap is secured to the second end of the outer tubular member. An inner tubular member includes a first end connected in a sliding manner to the first end cap and a second end rigidly affixed to the second end cap. The first end of the inner tubular member is coupled in fluid communication with the water outlet and the second end is coupled in fluid communication with the interior volume. Constructing the cartridge in this manner allows for more efficient manufacturing, while also facilitating the preferred flow of water through the interior volume of the outer tubular member and the purifying medium contained therein and outward flow through the inner tubular member.

These and other objectives, advantages and features of the invention will become more readily apparent to those of ordinary skill in the art upon review of the following detailed description of the preferred embodiments, taken in conjunction with the accompanying drawings.

DETAILED DESCRIPTION OF THE PREFERRED EMBODIMENTS

Figure 1:
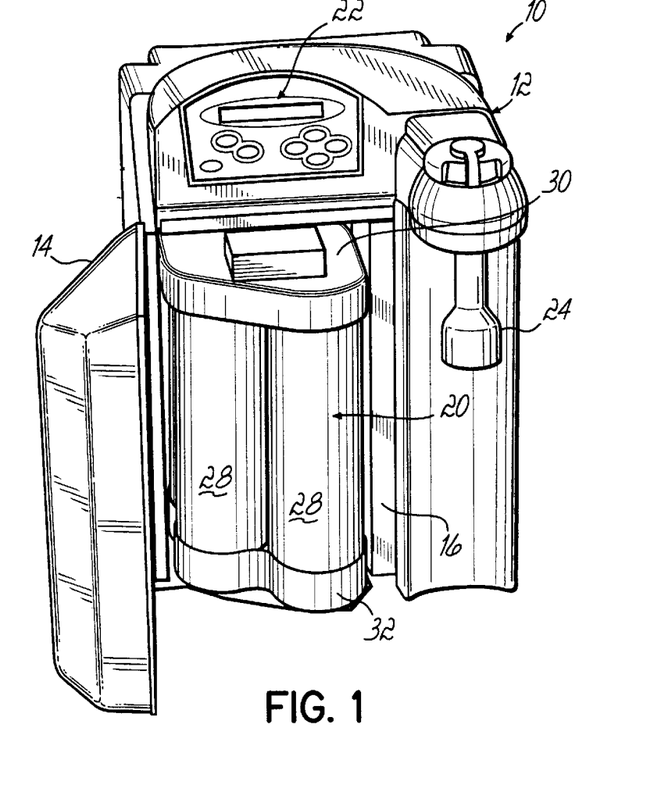
FIG. 1 is a perspective view illustrating a water purifying apparatus and filter assembly constructed in accordance with the preferred embodiment.

FIG. 1 illustrates a water purifying apparatus 10 including a housing 12 having a front opening with a door 14 for accessing an interior 16 of housing 12. In the preferred embodiment, apparatus 10 provides pure water having a resistivity of up to 18.2 megohm-cm and a total organic content of up to 10 parts per billion, as described in the above-incorporated patents. A filter assembly 20 is disposed within interior 16 and is constructed in accordance with a preferred embodiment of the invention as will be discussed in detail below. A control panel 22 is provided on housing 12 for controlling the operation of apparatus 10. A dispensing element 24 is provided for dispensing purified water from apparatus 10. Filter assembly 20 comprises a plurality of identically constructed cartridges 28 connected together by respective upper and lower cover plates 30, 32. In the preferred embodiment, four cartridges 28 are coupled in fluid communication with each other via a first manifold 34 and a second manifold to be discussed further below. It should be noted that the inventive aspects may apply to filter assemblies having less than four cartridges or more than four cartridges and also two filter assemblies configured in various shapes other than the generally diamond-shaped configuration of cartridges shown in the drawings. For example, three cartridges may be connected in a triangular shape, four cartridges may be connected in a square shape, five cartridges may be connected in a pentagonal shape, etc.

Figure 2A:
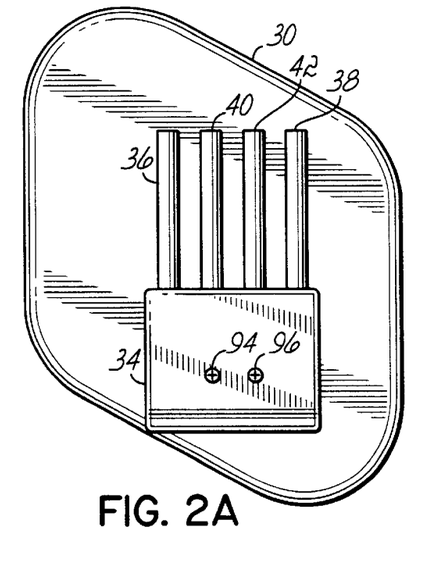
FIG. 2A is a top view of the filter assembly with a first manifold configured to connect with an auxiliary processing device.
Figure 2B:
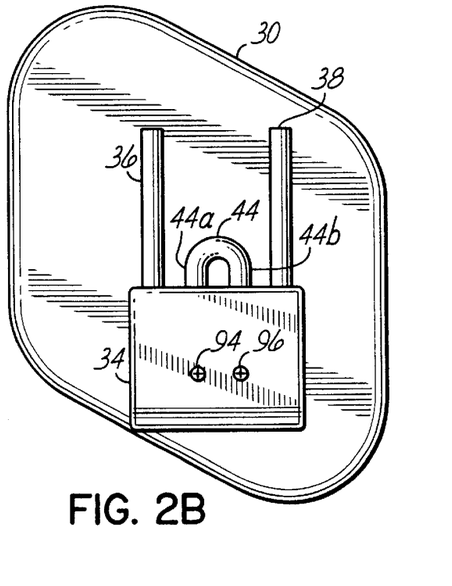
FIG. 2B is a top view similar to FIG. 2A, but showing the first manifold reconfigured to eliminate the auxiliary processing device and circulate the water only within the filter assembly.

As shown in FIGS. 2A and 2B; first manifold 34 is positioned on top of cover plate 30 and includes a water inlet 36 and a water outlet 38. Water introduced through inlet 36 moves from manifold 34 in a serial manner through each cartridge 28 before being discharged through water outlet 38, as will be discussed below. FIGS. 2A and 2B also illustrate the use of auxiliary ports 40, 42 for optionally connecting an auxiliary processing device, such as a UV chamber, between inlet 36 and outlet 38. In this case, water is discharged through auxiliary output port 40 before completing the circuit through cartridges 28 and, after processing in the auxiliary processing device (not shown in FIGS. 2A and 2B), is again introduced into filter assembly 20 through auxiliary input port 42 to complete the fluid circuit through cartridges 28 and finally exit through water outlet 38. FIG. 2B illustrates the alternative in which an auxiliary processing device, such as a UV chamber, is not connected to filter assembly 20. In this case, a bypass conduit 44 has a first port 44a which replaces auxiliary output port 40 and a second port 44b which replaces auxiliary input port 42. Thus, water is immediately diverted back into manifold 34 to complete the fluid circuit through each cartridge 28 of filter assembly 20 in a serial manner.

Figure 3:
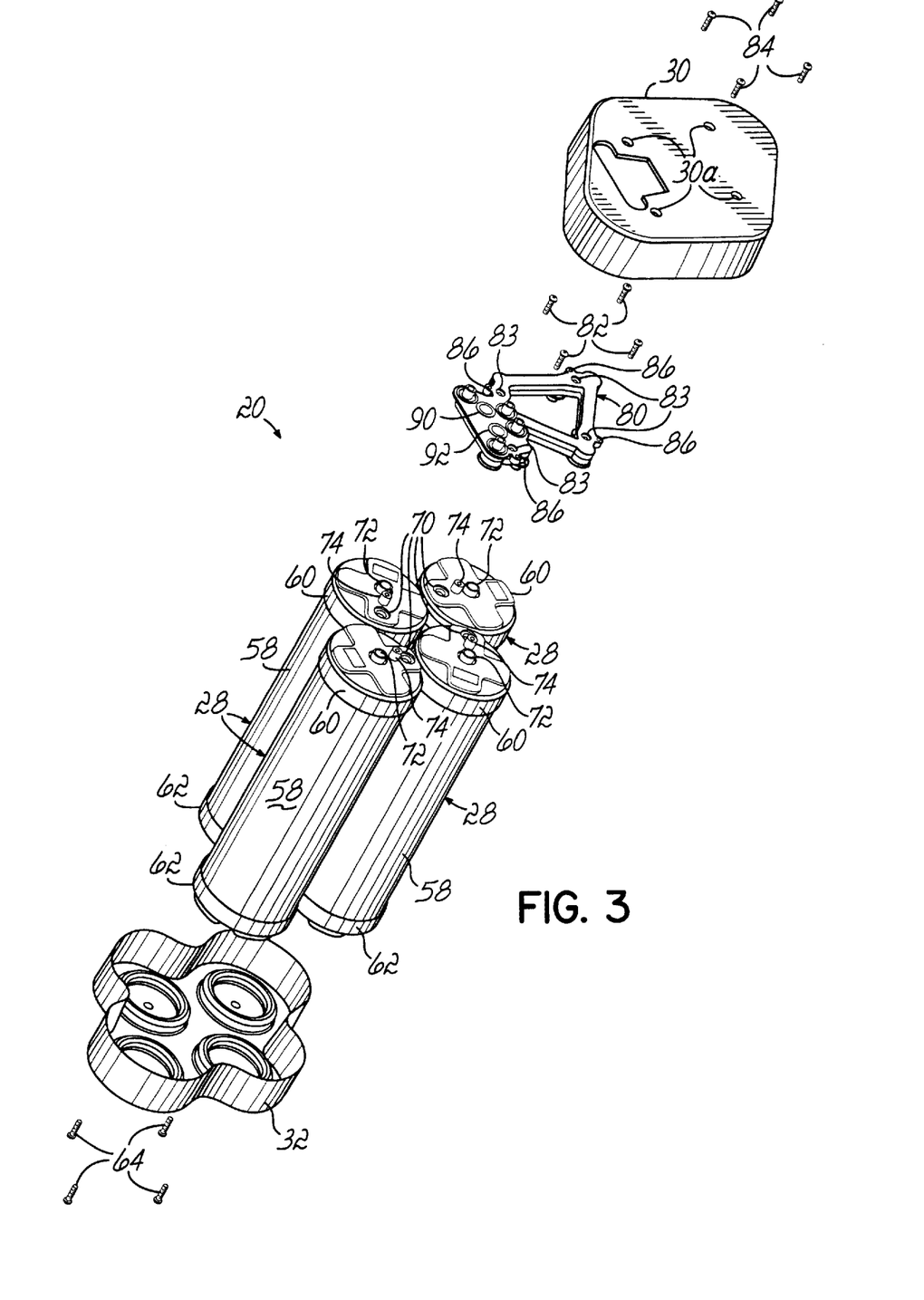
FIG. 3 is an exploded perspective view of the filter assembly constructed in accordance with the preferred embodiment.

FIG. 3 illustrates the general configuration of filter assembly 20 in exploded form. More particularly, each cartridge 28 is comprised of a tubular outer member 58 having an upper cap 60 and a lower cap 62. The respective lower caps 62 receive cover plate 32 and fasteners 64 are used to fix cover plate 32 in position on each lower cap 62 as shown in FIG. 1.

Each upper cap 60 includes a water inlet 70, a central water outlet 72, and an internally threaded boss 74 positioned generally therebetween. A second manifold 80 is affixed to caps 60 and fluidly coupled to the respective water inlets and outlets 70, 72 with fasteners 82 inserted through holes 83 and threaded into bosses 74. As will be described further below, first manifold 34 directs water into second manifold 80 and second manifold 80 then distributes the water serially through cartridges 28 before directing the water to outlet 38 of first manifold 34 (see FIGS. 2A and 2B). Cover plate 30 is fastened to second manifold 80 by fasteners 84 directed through holes 30a and received in threaded holes 86 of manifold 80. Holes 90, 92 receive respective fasteners 94, 96 (FIGS. 2A and 2B) for fastening first manifold 34 to second manifold 80. Fasteners 94, 96 are preferably quarter turn fasteners and, more preferably, comprise fasteners capable of hand turning by a user for quicker assembly.

Figure 4:
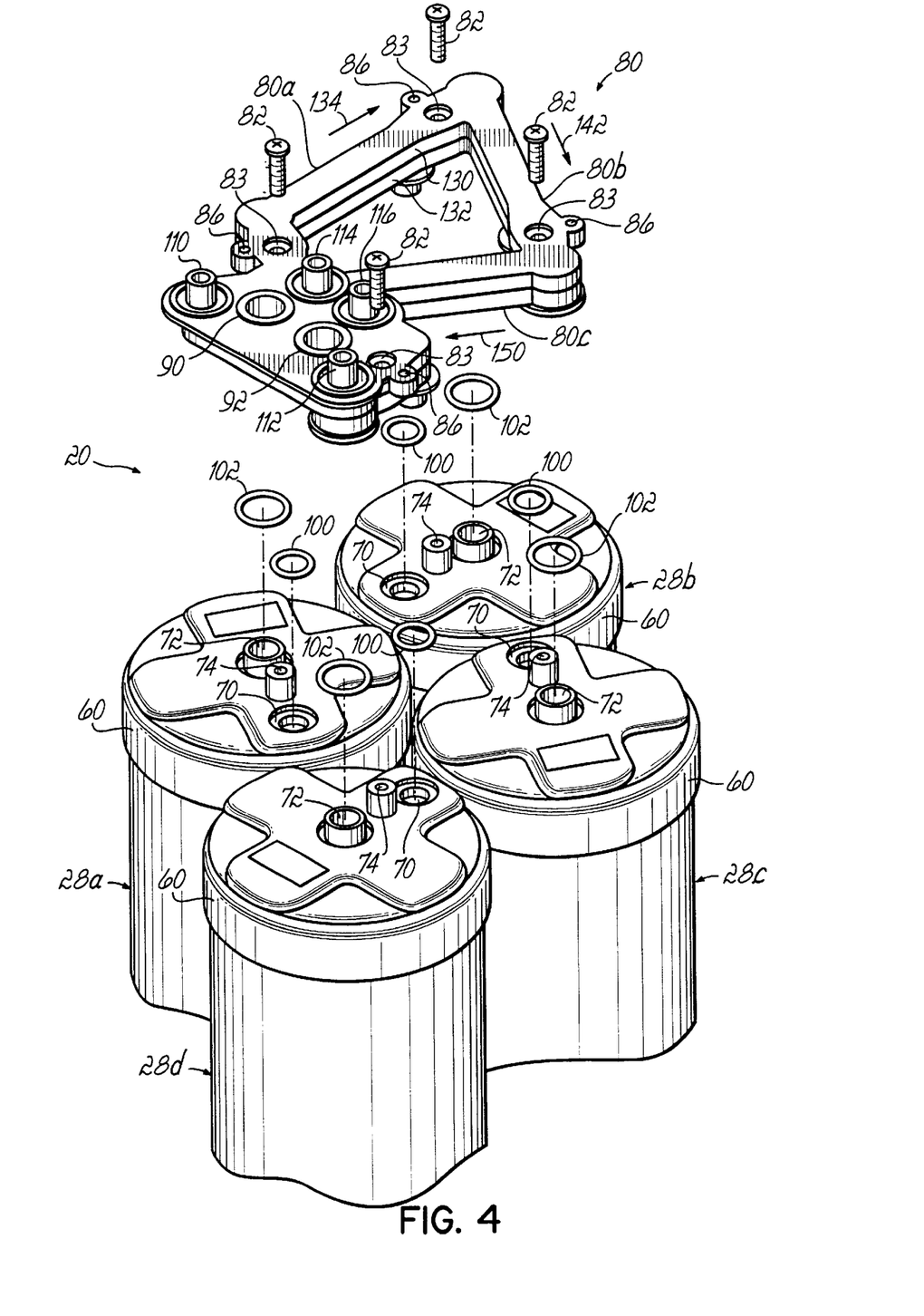
FIG. 4 is an exploded, enlarged perspective view of the filter assembly more specifically showing a second manifold for fluidly coupling several cartridges in a serial manner.
Figure 4A:
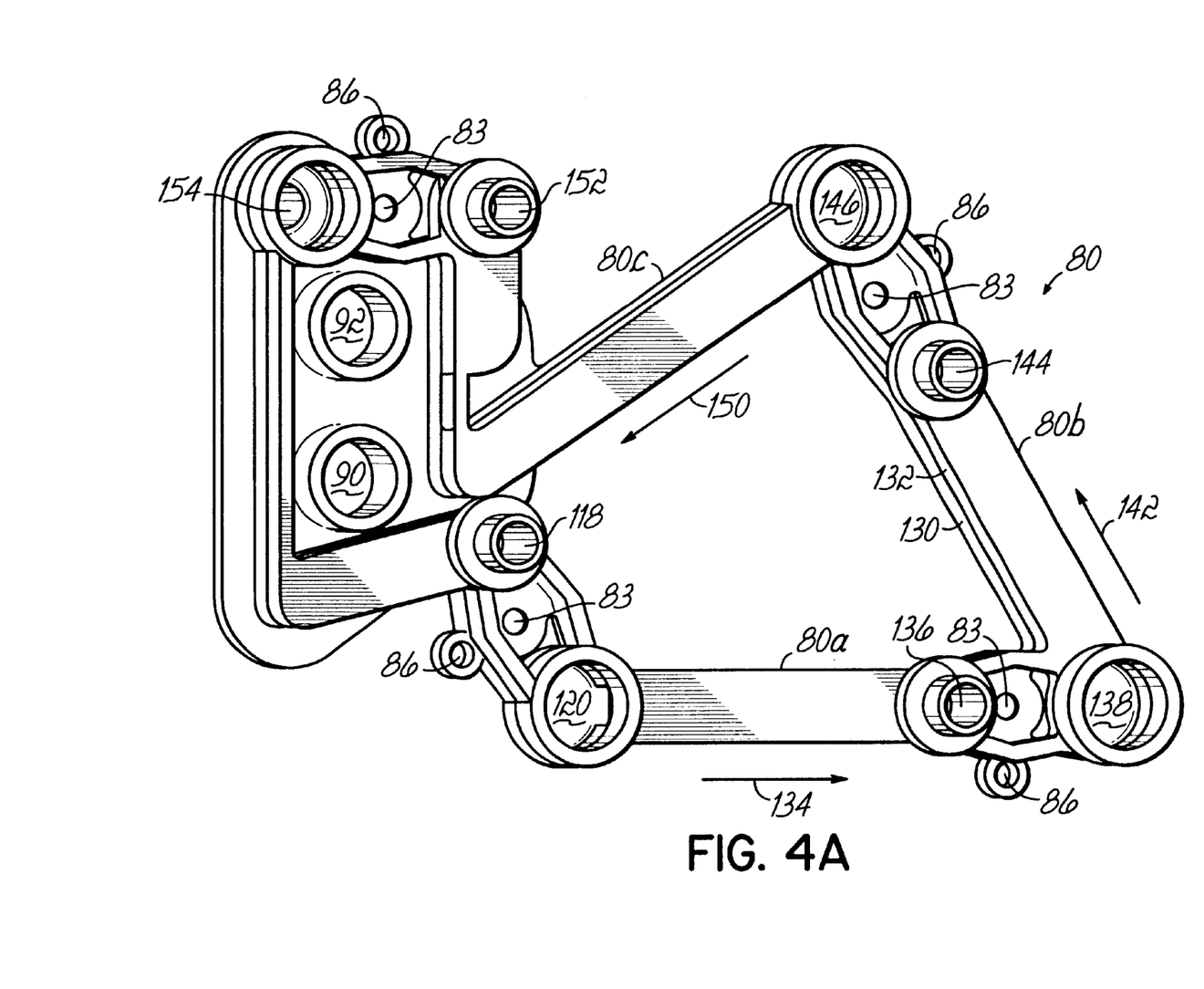
FIG. 4A is a perspective view showing the lower surface of the second manifold.

Referring now to FIGS. 4 and 4A, manifold 80 is secured in a fluid-tight manner to respective cartridges 28a, 28b, 28c, 28d through the use of the above-noted fasteners 82 placed through holes 83 and extending into threaded bosses 74 of the respective cartridges 28a–d. O-rings 100, 102 are respectively used to seal the fluid connections between inlets and outlets 70, 72 of each cartridge 28a–d and the corresponding ports on the underside of manifold 80. Those skilled in the art will appreciate that additional O-rings or other seals may be used for enhancing sealing characteristics. Manifold 80 further includes a water inlet 110 which receives water directly from inlet 36 of first manifold 34. Manifold 80 further includes a water outlet 112 fluidly coupled with outlet 38 of first manifold 34 through which water is discharged from filter assembly 20 upon completion of the filtering operation in each of the cartridges 28a–d. An auxiliary output port 114 is fluidly coupled with auxiliary output port 40 of first manifold 34 and an auxiliary input port 116 is fluidly coupled with auxiliary input port 42 of first manifold 34 (FIG. 2A).

In operation, water is directed into inlet 110 through inlet 36 of manifold 34 and is directed to inlet 70 of cartridge 28a through port 118. After the filtering operation is performed in cartridge 28a the water exits outlet 72 of cartridge 28a into port 120 of manifold 80 and travels in a passage (not shown) formed between manifold halves 130, 132 within leg 80a. The water moves in the direction of arrow 134 in manifold leg 80a and exits from a port 136 into inlet 70 of cartridge 28b. After the filtering operation in cartridge 28b is complete, the water is discharged through outlet 72 into a port 138 of manifold 80 and travels through leg 80b in the direction of arrow 142 to a discharge port 144 communicating with inlet 70 of cartridge 28c. After the filtering operation in cartridge 28c is complete, the water exits outlet 70 of cartridge 28c into port 146 of manifold 80 and travels in the direction of arrow 150 through leg 80c to auxiliary output port 114. If an auxiliary processing device, such as a UV chamber, is coupled to filter assembly 20, then the water passes through the auxiliary processing device and returns to auxiliary input port 116. If an auxiliary processing device is not connected to filter assembly 20, then auxiliary output port 114 is fluidly coupled to auxiliary input port 116 via manifold 34, as shown in FIG. 2B. From auxiliary input port 116, the water travels through manifold 80, through port 152, and into the inlet 70 of the final cartridge 28d. After the filtering operation is complete in cartridge 28d, the purified water exits at outlet 72 into port 154 and outlet 112 of manifold 80. Outlet 112 is fluidly coupled to outlet 38 of manifold 34 (FIGS. 2A and 2B). Outlet 38 is fluidly coupled to dispensing element 24 (FIG. 1).

Figure 5:
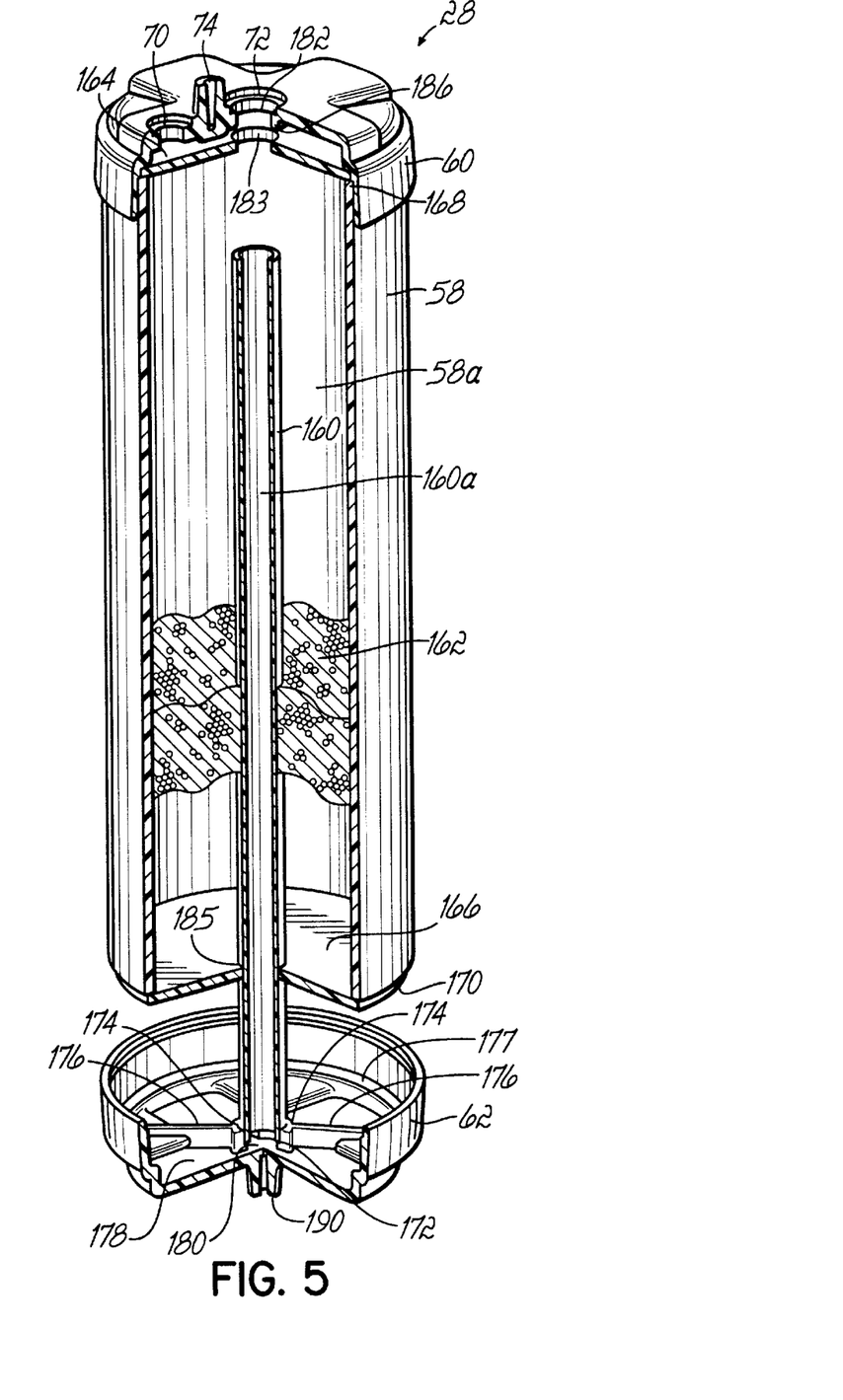
FIG. 5 is a perspective view of the preferred cartridge of the filter assembly shown partially cross-sectioned to illustrate inner details.

FIG. 5 illustrates the construction of a cartridge 28 in greater detail. All components of each cartridge 28 are preferably constructed from virgin polypropylene. Each cartridge 28 comprises an outer tubular member 58 receiving a smaller diameter inner tubular member 160. Each tubular member 58, 160 includes an interior volume 58a, 160a and these interior volumes 58a, 160a are separated from one another such that water traveling through inlet 70 travels through a filtering medium or media, such as a mass of resin beads 162, contained in interior volume 58a of outer tubular member 58 and suitable for the purity requirements of the application as known in the art. The water subsequently travels upward through inner tubular member 160 and through outlet 72. Cartridge 28 includes upper and lower filter discs 164, 166 held between respective upper and lower ends 168, 170 of outer tubular member 58 and caps 60, 62. Discs 164, 166 preferably comprise ⅛" thick polypropylene with a 125 micron pore size, however, this will depend on the size of the filtering media 162. Discs 164, 166 contain the media 162 in the interior volume 58a of outer tubular member 58 and ensure that the media 162 does not enter the interior volume 160a of inner tubular member 160.

Inner tubular member 160 is rigidly fixed at its lower end 172 to a plurality of supports 174 spaced approximately 90° from each other. A plurality of supporting ribs 176 also extend radially from supports 174. A circumferential ledge 177 is also provided for supporting a lower surface of disc 166 along with ribs 176 and supports 174 after assembly. The lower end 172 of the inner tubular member 160 is supported at a spaced distance from the central interior surface 178 of cap 62 such that a space 180 is created to allow flow of water through the interior volume 58a of outer tubular member 58, through lower filter disc 166 and subsequently in an upward direction through the interior space or volume 160a of the inner tubular member 160. Preferably, inner tubular element 160 is slidably received within an upper orifice 182 of cap 60 upon passing through a hole 183 in upper filter disc 168. A similar hole 185 is provided in lower disc 166 for receiving tubular member 160. Each hole 183, 185 receives tubular member 160 with a frictional fit. Lower filter screen disc 164 may also be supported by a plurality of ribs, as well as a circumferential ledge (not shown) and an additional support structure 186 extending around orifice 182 which slidably receives inner tubular member 160. FIG. 5 further illustrates a boss 190 contained in lower cap 62 for receiving one of the fasteners 64 discussed in connection with FIG. 3.

Figure 6A:
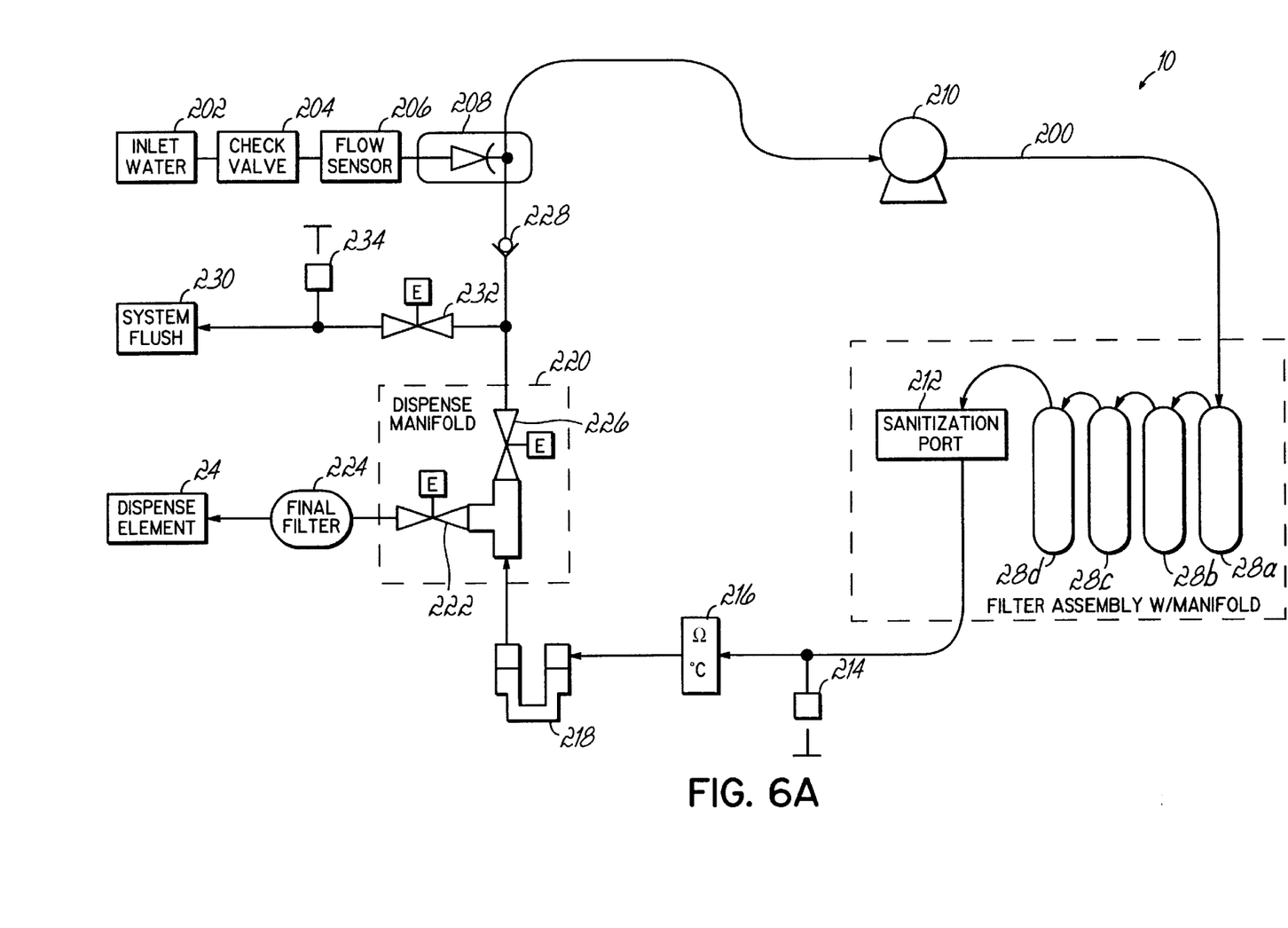
FIG. 6A is a schematic illustration of the water purifying apparatus illustrating serially connected cartridges.

FIG. 6A is a schematic diagram of water purifying apparatus 20 showing one preferred fluid circuit 200. Water enters an inlet 202 of circuit 200 through a check valve 204 and flow sensor 206 and preferably also through a pressure regulator 208. Flow sensor 206 is used to determine the volume of water dispensed from apparatus 10. This is more fully disclosed in a co-pending application, filed on even date herewith under Express Mail No. EL508245515US, and hereby fully incorporated herein by reference. Pressure regulator 208 preferably limits the pressure within the fluid circuit 200 to 15 psi. A pump 210 is preferably used to circulate the water into and through the fluid circuit 200. Alternatively, pump 210 may be eliminated and circuit 200 may simply receive pressurized water through pressure regulator 208. The water is directed in a serial manner through filter assembly 20 or cartridges 28a–d as schematically illustrated in FIG. 6A, and discussed in greater detail above. The purified water moves past a sanitization port 212 which may be used to periodically inject a sanitent into circuit 200 as necessitated by application requirements. A total organic carbon analyzer port 214 is provided along with a temperature and resistivity cell 216 for measuring the purity of the water upon leaving the filter assembly 20, as is generally known in the art. A jumper 218 is provided for optionally connecting a remote dispensing gun (not shown). The purified water then enters a dispense manifold 220. A first normally-closed solenoid valve 222 is provided and may be selectively opened by the user to direct water through a final filter 224 and through the dispensing element 24 (FIG. 1). When purified water is not being dispensed, a normally-open solenoid valve 226 is provided to direct the water in a recirculating manner through a check valve 228 and back to the beginning of circuit 200 to be continuously recirculated by pump 210. Check valve 228 prevents backflow from inlet 202 and also provides any necessary back pressure for a manual valve (not shown) associated with a remote gun (not shown) connected to the jumper 218. A system flush element 230 is provided and accessed through another normally-closed solenoid valve 232 and includes a second total organic carbon analyzer port 234.

Figure 6B:
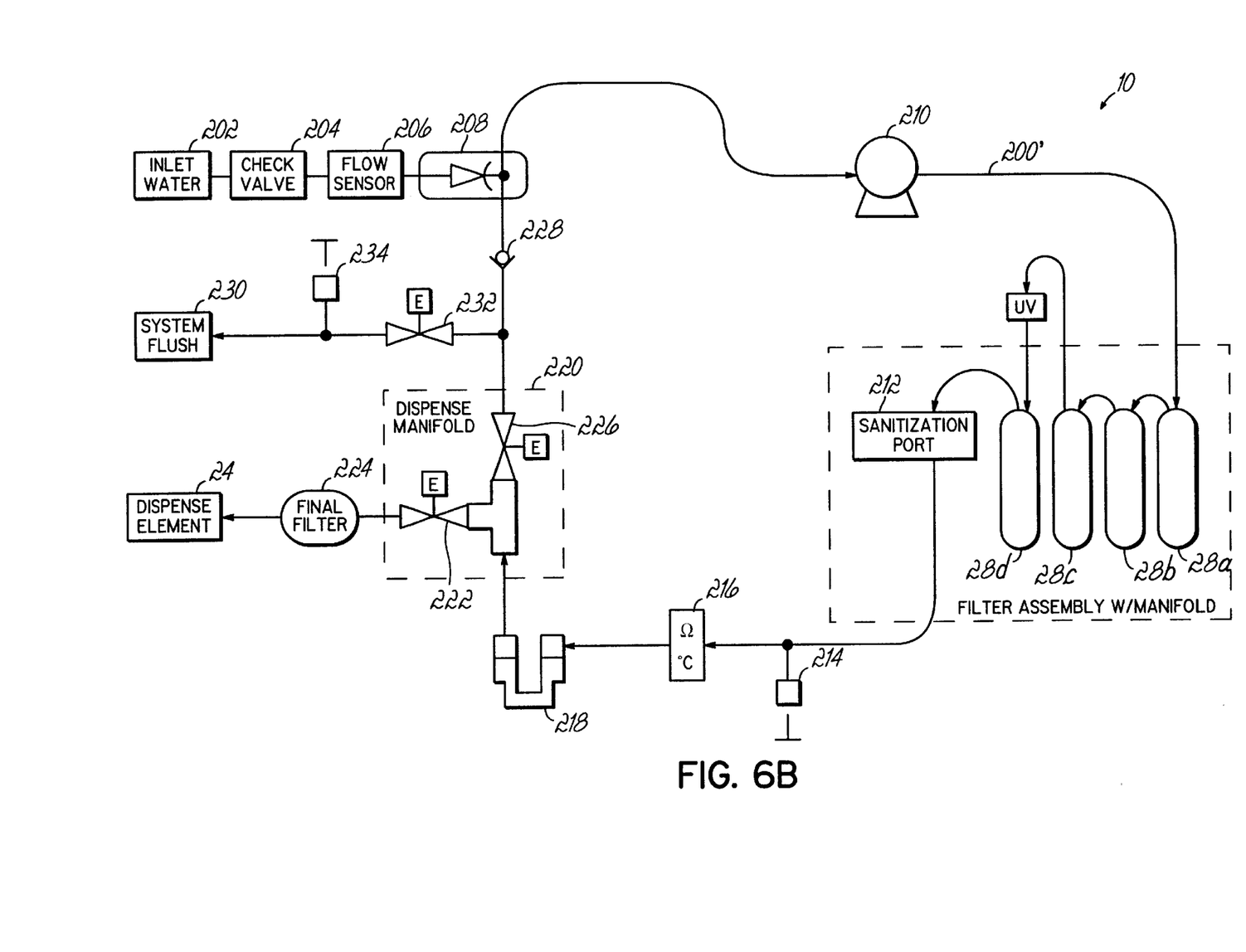
FIG. 6B is a schematic illustration similar to FIG. 6A, but illustrating the connection of an optional UV chamber to the filter assembly as an auxiliary processing device.

FIG. 6B is identical FIG. 6A, except that FIG. 6B illustrates a modified circuit 200' with an optional connection of a UV chamber 240 made between the third and fourth cartridges 28c, 28d. Water is directed out of filter assembly 20 at this location, through UV chamber 240, and back into the final filter cartridge 28d for a final polishing prior to exiting filter assembly 20.

While the present invention has been illustrated by a description of these preferred embodiments and while these embodiments have been described in some detail, it is not the intention of the Applicants to restrict or in any way limit the scope of the appended claims to such detail. Additional advantages and modifications will readily appear to those skilled in the art. This has been a description of the present invention, along with the preferred methods of practicing the present invention as currently known. Various aspects of this invention may be used alone or in different combinations.

The scope of the invention itself should only be defined by the appended claims, wherein we claim:

1. A water purifying apparatus for optional use with an auxiliary processing device, the apparatus comprising:
   a plurality of cartridges affixed to one another as a filter assembly, each cartridge having first and second ends, a side wall extending between the first and second ends, and an interior volume adapted to receive a filtering medium,
   a plurality of end caps respectively connected with the first ends of said plurality of cartridges, said end caps each having a water inlet and a water outlet, and
   a manifold coupled with the water inlets and water outlets of said plurality of end caps to connect said cartridges for fluid communication such that the water flows through the filtering medium within the interior volume of one cartridge, through the manifold, to the filtering medium within the interior volume of another cartridge, said manifold further including a water inlet for directing water into said cartridges, a water outlet for directing water out of said cartridges and a pair of auxiliary ports including an auxiliary output port for directing water from the cartridge assembly to the auxiliary processing device and an auxiliary input port for directing the water from the auxiliary processing device to one of said water inlets.

2. The apparatus of claim 1 wherein the auxiliary processing device is coupled with said auxiliary input and output ports.

3. The apparatus of claim 1, wherein said auxiliary processing device comprises an ultraviolet chamber.

4. The apparatus of claim 1, wherein the filtering medium is contained within each cartridge.

5. The apparatus of claim 1, wherein said manifold is removably coupled to said plurality of end caps.

6. The apparatus of claim 5, wherein said manifold comprises a first manifold, and further comprising a second manifold removably coupled between the first manifold and the plurality of cartridges for directing the water from the water inlet of said first manifold through each cartridge and through the water outlet of said first manifold.

7. The apparatus of claim 1 further comprising a conduit adapted to be connected between the auxiliary input port and the auxiliary output port to maintain the plurality of cartridges fluidly coupled to one another.

8. The apparatus of claim 1 further comprising a pump for circulating the water through the cartridges.

9. The apparatus of claim 1, wherein each cartridge includes a longitudinal axis and the water inlet and water outlet of each cartridge extends generally parallel to said longitudinal axis.

10. A water purifying apparatus comprising:
    a plurality of cartridges affixed to one another as a filter assembly, each cartridge having first and second ends, a side wall extending between the first and second ends, and an interior volume adapted to receive a filtering medium,
    a plurality of end caps respectively connected with the first ends of said plurality of cartridges, said end caps each having a water inlet and a water outlet, and
    a removable manifold coupled with the water inlets and water outlets of said plurality of end caps to connect said cartridges for fluid communication such that the water flows through the filtering medium within the interior volume of one cartridge through the manifold to the filtering medium within the interior volume of another cartridge, wherein said manifold includes first and second manifold sections connected together along a length of said manifold to form a fluid passage therebetween.

11. The apparatus of claim 10, wherein the filtering medium is contained within each cartridge.

12. The apparatus of claim 10, wherein said manifold comprises a first manifold, and further comprising a second manifold removably coupled between the first manifold and the plurality of cartridges for directing the water from the water inlet of said first manifold through each cartridge and through the water outlet of said first manifold.

13. The apparatus of claim 10 further comprising a pump for circulating the water through the cartridges.

14. The apparatus of claim 10, wherein each cartridge includes a longitudinal axis and the water inlet and water outlet of each cartridge extends generally parallel to said longitudinal axis.

15. A water purifying apparatus, comprising:
    a plurality of cartridges affixed to one another as a filter assembly, each cartridge having first and second ends defined along a longitudinal axis of the cartridge, a side wall extending between the first and second ends, and an interior volume adapted to receive a filtering medium,
    a plurality of end caps respectively connected with the first ends of said plurality of cartridges, said end caps each having a water inlet and a water outlet extending generally parallel to said longitudinal axis, and
    a manifold coupled with the water inlets and water outlets of said plurality of end caps to connect said cartridges for fluid communication such that the water flows through the filtering medium within the interior volume of one cartridge through the manifold to the filtering medium within the interior volume of another cartridge, wherein said manifold includes first and second manifold sections connected together along a length of said manifold to form a fluid passage therebetween.

16. The apparatus of claim 15, wherein the filtering medium is contained within each cartridge.

17. The apparatus of claim 15, wherein said manifold comprises a first manifold, and further comprising a second manifold removably coupled between the first manifold and the plurality of cartridges for directing the water from the water inlet of said first manifold through each cartridge and through the water outlet of said first manifold.

18. The apparatus of claim 15 further comprising a pump for circulating the water through the cartridges.

19. The apparatus of claim 15, wherein each cartridge further comprises:
   an outer tubular member having said first and second ends and said interior volume,
   a second end cap secured on the second end of said outer tubular member, and
   an inner tubular member having a first end connected in a sliding manner to said first end cap and a second end rigidly affixed to said second end cap, said first end coupled in fluid communication with said water outlet and said second end coupled in fluid communication with said interior volume.

20. A cartridge for use in a water purification system, the cartridge comprising:
   an outer tubular member having first and second ends and an interior volume adapted to receive a filtering medium,
   a first end cap secured to said first end, said first end cap having a water inlet leading to said interior volume and a water outlet,
   a second end cap secured to said second end, and
   an inner tubular member having a first end connected in a sliding manner to said first end cap and a second end rigidly affixed to said second end cap, said first end coupled in fluid communication with said water outlet and said second end coupled in fluid communication with said interior volume.

21. A method of purifying water in a purification system including a plurality of filter cartridges affixed together at first and second ends thereof to form a filter assembly, the method comprising:
   directing the water through at least a first one of said filter cartridges,
   directing the water to an auxiliary processing device outside of said filter assembly,
   performing a purifying operation on the water in the auxiliary processing device, and
   directing the water back into at least one additional filter cartridge of said filter assembly to perform a final filtering operation on the water.

22. The method of claim 21, wherein said auxiliary processing device comprises an ultraviolet chamber and the purifying operation further comprises subjecting the water to ultraviolet radiation in the ultraviolet chamber.

* * * * *